(12) United States Patent
Hasegawa et al.

(10) Patent No.: US 8,381,054 B2
(45) Date of Patent: Feb. 19, 2013

(54) RECEPTION APPARATUS, RECEPTION METHOD, AND PROGRAM

(75) Inventors: Ryo Hasegawa, Tokyo (JP); Katsumi Takaoka, Chiba (JP)

(73) Assignee: Sony Corporation, Tokyo (JP)

( * ) Notice: Subject to any disclaimer, the term of this patent is extended or adjusted under 35 U.S.C. 154(b) by 978 days.

(21) Appl. No.: 12/424,342

(22) Filed: Apr. 15, 2009

(65) Prior Publication Data

US 2009/0276670 A1    Nov. 5, 2009

(30) Foreign Application Priority Data

Apr. 30, 2008    (JP) ................. 2008-118549

(51) Int. Cl.
*G06F 11/00*    (2006.01)
(52) U.S. Cl. ........................... 714/746; 714/814
(58) Field of Classification Search ............. 714/746, 714/814
See application file for complete search history.

(56) References Cited

U.S. PATENT DOCUMENTS

| | | | | |
|---|---|---|---|---|
| 5,898,699 A * | 4/1999 | Chiba | ............... | 714/704 |
| 7,474,990 B2 * | 1/2009 | Kim | ............... | 702/185 |
| 7,606,342 B1 * | 10/2009 | Wiss et al. | ............... | 375/371 |
| 7,734,465 B2 * | 6/2010 | Wang et al. | ............... | 704/219 |
| 7,801,181 B2 * | 9/2010 | Song et al. | ............... | 370/478 |
| 2001/0007480 A1 * | 7/2001 | Hong et al. | ............... | 348/725 |
| 2003/0182619 A1 * | 9/2003 | Greiss et al. | ............... | 714/798 |
| 2004/0049717 A1 * | 3/2004 | Ahn | ............... | 714/699 |
| 2006/0236188 A1 * | 10/2006 | Behzad et al. | ............... | 714/746 |
| 2009/0319844 A1 * | 12/2009 | Chiou | ............... | 714/746 |

FOREIGN PATENT DOCUMENTS

JP    2002-094585    3/2002

* cited by examiner

*Primary Examiner* — Yolanda L Wilson
(74) *Attorney, Agent, or Firm* — K&L Gates LLP

(57) ABSTRACT

A reception apparatus that receives a signal, including, a correction section, an error detection section, a filtering section, and a setting section is provided.

7 Claims, 8 Drawing Sheets

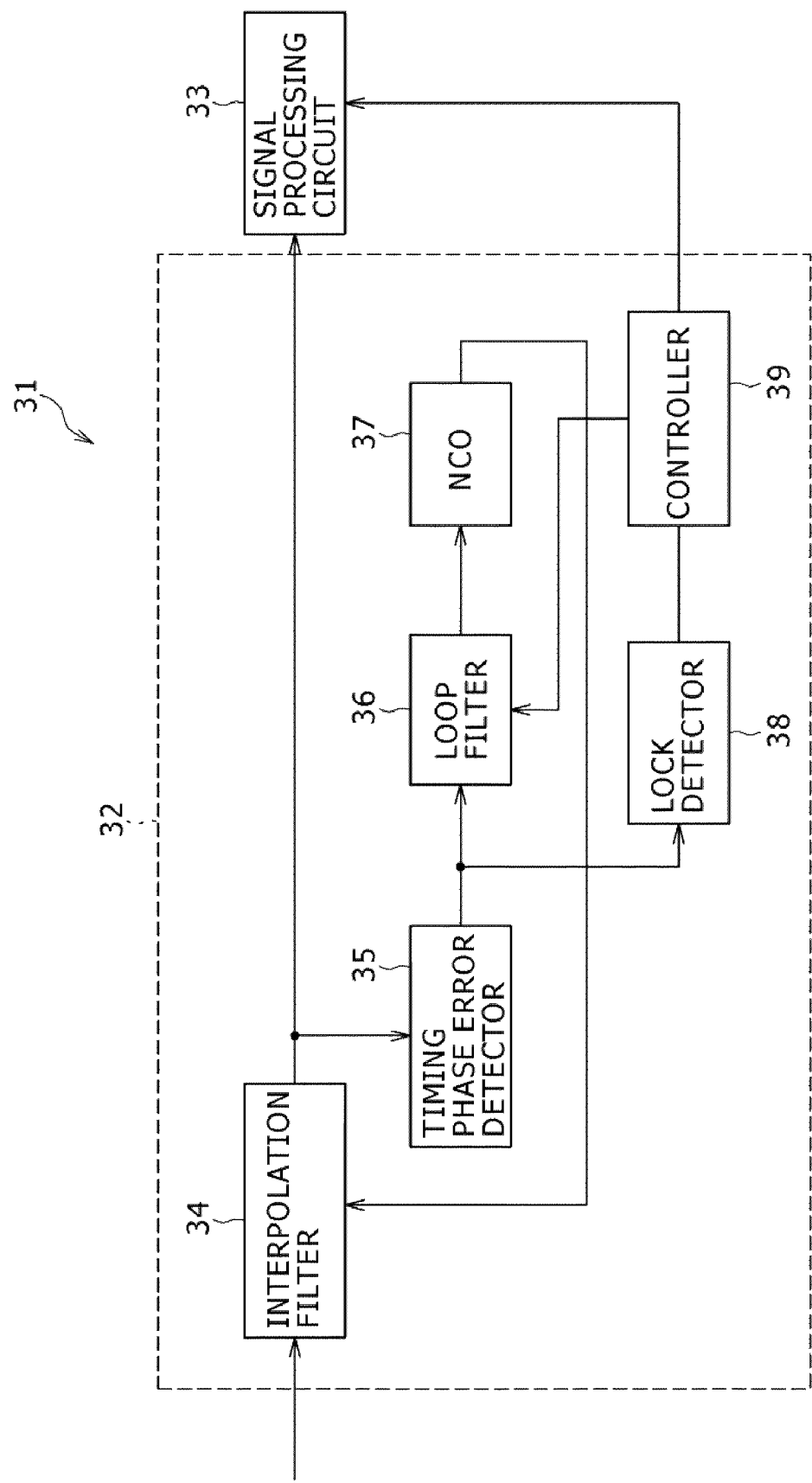
F I G . 5

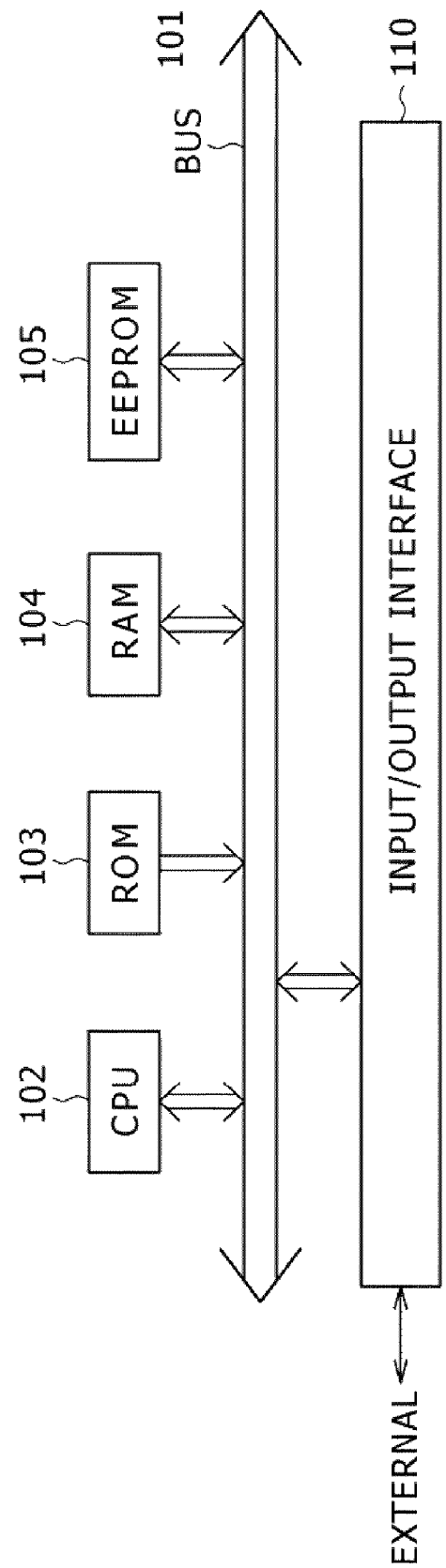

RECEPTION APPARATUS, RECEPTION METHOD, AND PROGRAM

CROSS REFERENCES TO RELATED APPLICATIONS

The present application claims priority to Japanese Patent Application JP 2008-118549 filed in the Japan Patent Office on Apr. 30, 2008, the entire contents of which is incorporated herein by reference.

BACKGROUND

At present, reception apparatuses for receiving a digital broadcast or the like need to perform correction operations such as timing correction and phase noise correction, when receiving a broadcast wave or the like and subjecting the received signal to digital demodulation, for example. In general, these corrections are performed in a seamless manner by correction circuits for performing automatic control based on control engineering.

For example, FIG. 1 is a block diagram of a known correction circuit.

As illustrated in FIG. 1, the correction circuit 11A includes a correction section 12, an error detector 13, a loop filter 14, and a numerically controlled oscillator (NCO) 15, which form a feedback loop.

A reception signal received by a reception circuit having an antenna (not shown) is supplied to the correction section 12. The correction section 12 subjects the reception signal to correction of removing an error (e.g., a frequency error, a phase error, etc.) in the reception signal based on an error correction signal supplied from the NCO 15. Then, the correction section 12 supplies the resulting reception signal obtained after the correction to the error detector 13, and at the same time outputs the resulting reception signal to a signal processing circuit 21 in a subsequent stage, such as a demodulation circuit or a decoding circuit, for example.

The error detector 13 detects an error in the reception signal obtained after the correction as supplied from the correction section 12, and supplies a corresponding error signal to the loop filter 14. The loop filter 14 filters the error signal supplied from the error detector 13 to smooth the error signal, and supplies the smoothed error signal to the NCO 15. In accordance with the error signal supplied from the loop filter 14, the NCO 15 controls an oscillation frequency of the error correction signal to be supplied to the correction section 12, to generate the error correction signal with an oscillation frequency corresponding to the error.

Then, the reception signal is corrected by the correction section 12 based on the error correction signal supplied from the NCO 15 so that the error in the reception signal outputted from the correction section 12 will be decreased. If the error in the reception signal outputted from the correction section 12 is thus decreased to such an extent that it falls into a predetermined error range, the correction of the reception signal is completed. That is, the reception signal is captured.

When the reception signal has been captured in the above-described manner, the correction circuit 11A shifts from an initial capture process for capturing the reception signal to a synchronization maintenance process for maintaining synchronization of the captured reception signal. In the reception apparatus, a lock signal outputted from the correction circuit is used as a trigger for the shift of the process.

A correction circuit 11B as illustrated in FIG. 2 includes a lock detector 16 that outputs the lock signal.

In FIG. 2, the error signal outputted from the error detector 13 is supplied to the lock detector 16. The lock detector 16 monitors the error signal. When the error in the reception signal has fallen into the predetermined error range, the lock detector 16 supplies the lock signal, indicative of the capture of the reception signal, to the signal processing circuit 21.

FIG. 3 is a flowchart for explaining a known initial capture process.

For example, once the reception apparatus starts reception of the signal, the initial capture process is started. At step S11, the correction of the reception signal is started by the feedback loop formed by the correction section 12, the error detector 13, the loop filter 14, and the NCO 15, while the monitoring of the error signal is started by the lock detector 16.

At step S12, the signal processing circuit 21 determines whether or not the lock signal has been supplied from the lock detector 16.

If the signal processing circuit 21 determines at step S12 that the lock signal has not supplied from the lock detector 16, control proceeds to step S13. At step S13, the signal processing circuit 21 determines whether or not a capture completion time, which is set as a time for capturing the signal, has elapsed since the start of the correction of the reception signal at step S11.

If the signal processing circuit 21 determines at step S13 that the capture completion time has not elapsed, control returns to step S12.

Meanwhile, if the signal processing circuit 21 determines at step S13 that the capture completion time has elapsed, control proceeds to step S14. At step S14, the signal processing circuit 21 finishes the correction of the reception signal by the correction circuit 11B.

After the process of step S14, control proceeds to step S15. At step S15, the signal processing circuit 21 performs a process that should be performed when the reception signal has not been captured within the predetermined capture completion time. Examples of this process include a process of displaying, on a display section (not shown), an indication that the reception of the reception signal has ended in failure. Then, the initial capture process is ended.

Meanwhile, if the signal processing circuit 21 determines at step S12 that the lock signal has been supplied from the lock detector 16, control proceeds to step S16. At step S16, the process of shifting from the initial capture process to the synchronization maintenance process is performed. For example, in general, a band of the loop filter 14 is set to be wide in the initial capture process and narrow in the synchronization maintenance process, with the view of securing a suitable capture range and in view of process stability in the subsequent stage. That is, at step S16, the band of the loop filter 14 is shifted from a wide band to a narrow band.

After the process of step S16, the initial capture process is ended.

An interpolation filter and a timing phase error detector, for example, may be used as the correction section 12 and the error detector 13, respectively, in the structure of the correction circuit 11B, to perform timing recovery (timing correction).

FIG. 4 is a block diagram illustrating an exemplary structure of a correction circuit 11C that performs the timing recovery.

In the correction circuit 11C, a timing phase error detector 17 detects a timing phase error in the reception signal as outputted from an interpolation filter 18, and an error correction signal based on the timing phase error is supplied from the NCO 15 to the interpolation filter 18. Then, in accordance with the error correction signal supplied from the NCO 15, the interpolation filter 18 adjusts timing for a frequency with which the reception signal is sampled, to correct deviation in timing of the reception signal.

For example, Japanese Patent Laid-open No. 2002-94585 discloses a reception apparatus that adjusts a gain of a loop filter based on a result of detection of an error in the reception signal.

As described above, in general correction circuits, the band of the loop filter is set to be wide in the initial capture process and narrow in the synchronization maintenance process. However, if the band of the loop filter is too wide, compared to the error in the reception signal, in the initial capture process, a capture time, which is a barometer of digital demodulation performance, may become long.

Specifically, in the case where the band of the loop filter is too wide, compared to the error in the reception signal, variations in the amount of correction by the feedback loop might be so great as to make convergence of the correction amount difficult to achieve, resulting in an extended time required to achieve the convergence of the correction amount and completion of the correction. As a result, the capture time, which is a time required to complete the correction of the error, becomes long.

On the other hand, if the band of the loop filter is set to be narrow in the initial capture process, it may become difficult to capture a reception signal with a great error. Therefore, it is necessary to set the band of the loop filter to be wide enough to secure a suitable capture range.

As such, there has been a desire to enable efficient signal capture, i.e., to reduce the time required to capture a reception signal with a small error while at the same time allowing the capture of a reception signal with a great error.

SUMMARY

The present application relates to a reception apparatus, a reception method, and a program. In particular, the present application relates to a reception apparatus, a reception method, and a program which enable efficient signal capture.

According to an embodiment there is provided a reception apparatus that receives a signal, the reception apparatus including:

a correction section configured to correct an error in the signal in order to capture the signal;

an error detection section configured to detect an error in the signal after the correction as outputted from the correction section, relative to a predetermined reference signal;

a filtering section configured to filter the error detected by the error detection section with a predetermined band;

an error correction signal generation section configured to generate an error correction signal indicative of an amount of correction of the error based on the error filtered by the filtering section, and supplying the error correction signal to the correction section; and a setting section configured to set the predetermined band of the filtering section to a first band at a start of the correction by the correction section, and, if capture of the signal is not completed until a predetermined capture completion time elapses since the start of the correction by the correction section, setting the predetermined band of the filtering section to a second band wider than the first band.

According to another embodiment there is provided a reception method employed in a reception apparatus that receives a signal, the reception apparatus including
a correction section configured to correct an error in the signal in order to capture the signal, an error detection section configured to detect an error in the signal after the correction as outputted from the correction section, relative to a predetermined reference signal, a filtering section configured to filter the error detected by the error detection section with a predetermined band, and an error correction signal generation section configured to generate an error correction signal indicative of an amount of correction of the error based on the error filtered by the filtering section, and supplying the error correction signal to the correction section, the reception method comprising the step of:

setting the predetermined band of the filtering section to a first band at a start of the correction by the correction section, and, if capture of the signal is not completed until a predetermined capture completion time elapses since the start of the correction by the correction section, setting the predetermined band of the filtering section to a second band wider than the first band.

According to another embodiment there is provided a program to be executed by a computer that controls a reception apparatus that receives a signal, the reception apparatus including a correction section configured to correct an error in the signal in order to capture the signal, an error detection section configured to detect an error in the signal after the correction as outputted from the correction section, relative to a predetermined reference signal, a filtering section configured to filter the error detected by the error detection section with a predetermined band, and an error correction signal generation section configured to generate an error correction signal indicative of an amount of correction of the error based on the error filtered by the filtering section, and supplying the error correction signal to the correction section, the program causing the computer to execute a process comprising the step of:

setting the predetermined band of the filtering section to a first band at a start of the correction by the correction section, and, if capture of the signal is not completed until a predetermined capture completion time elapses since the start of the correction by the correction section, setting the predetermined band of the filtering section to a second band wider than the first band.

Accordingly, embodiments of the present application enable efficient signal capture.

Additional features and advantages are described herein, and will be apparent from the following Detailed Description and the figures.

BRIEF DESCRIPTION OF THE FIGURES

FIG. 5 is a block diagram illustrating an exemplary structure of a reception apparatus 31 according to an embodiment;

FIG. 8 is a block diagram illustrating an exemplary structure of a computer according to an embodiment.

DETAILED DESCRIPTION

Figure 1:
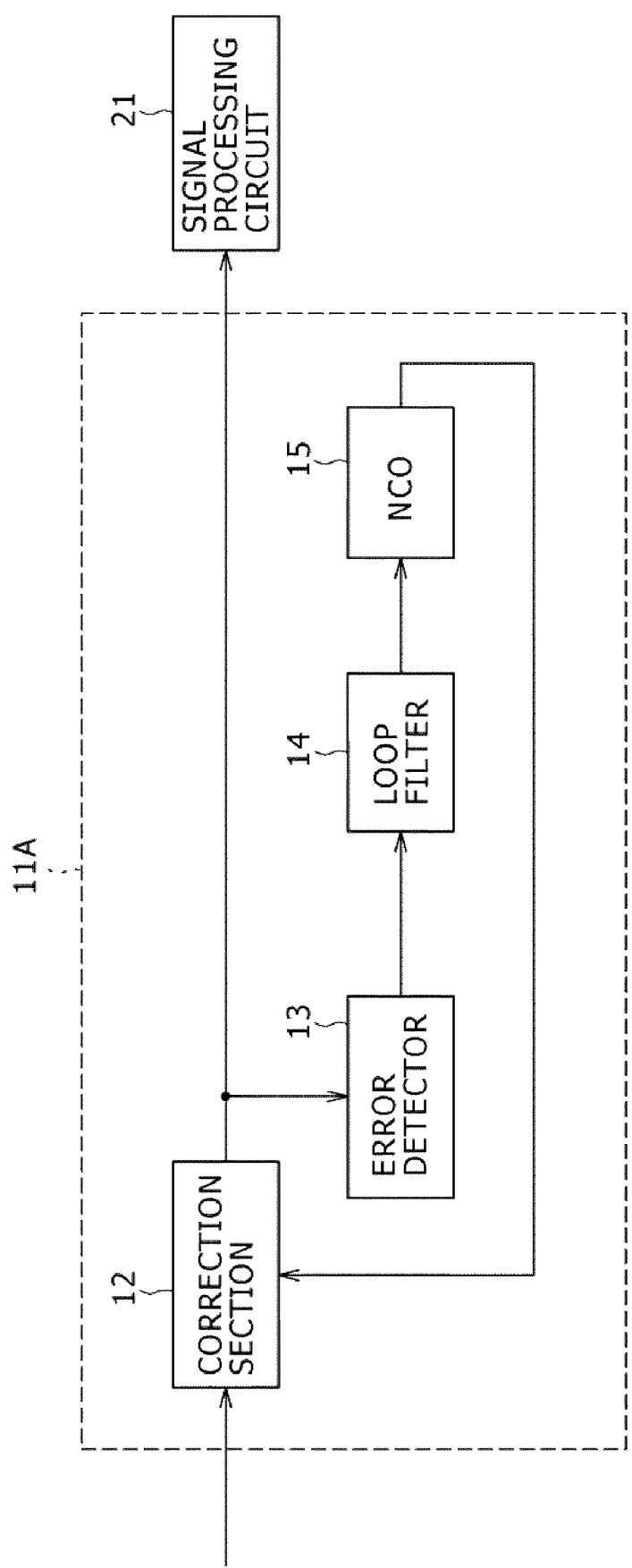
FIG. 1 is a block diagram illustrating an exemplary structure of a known correction circuit.
Figure 2:
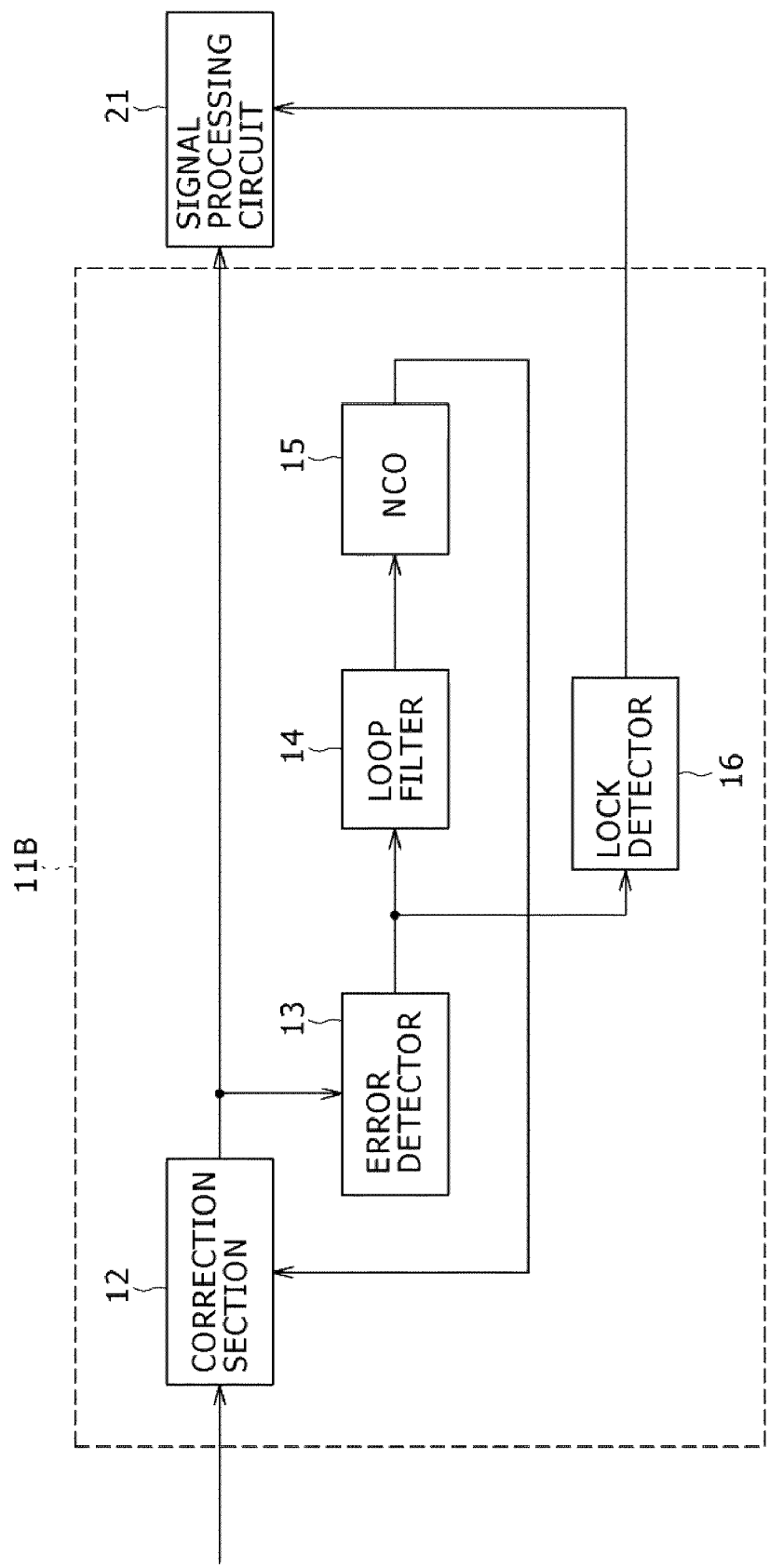
FIG. 2 is a block diagram illustrating an exemplary structure of a correction circuit having a lock detector.
Figure 3:
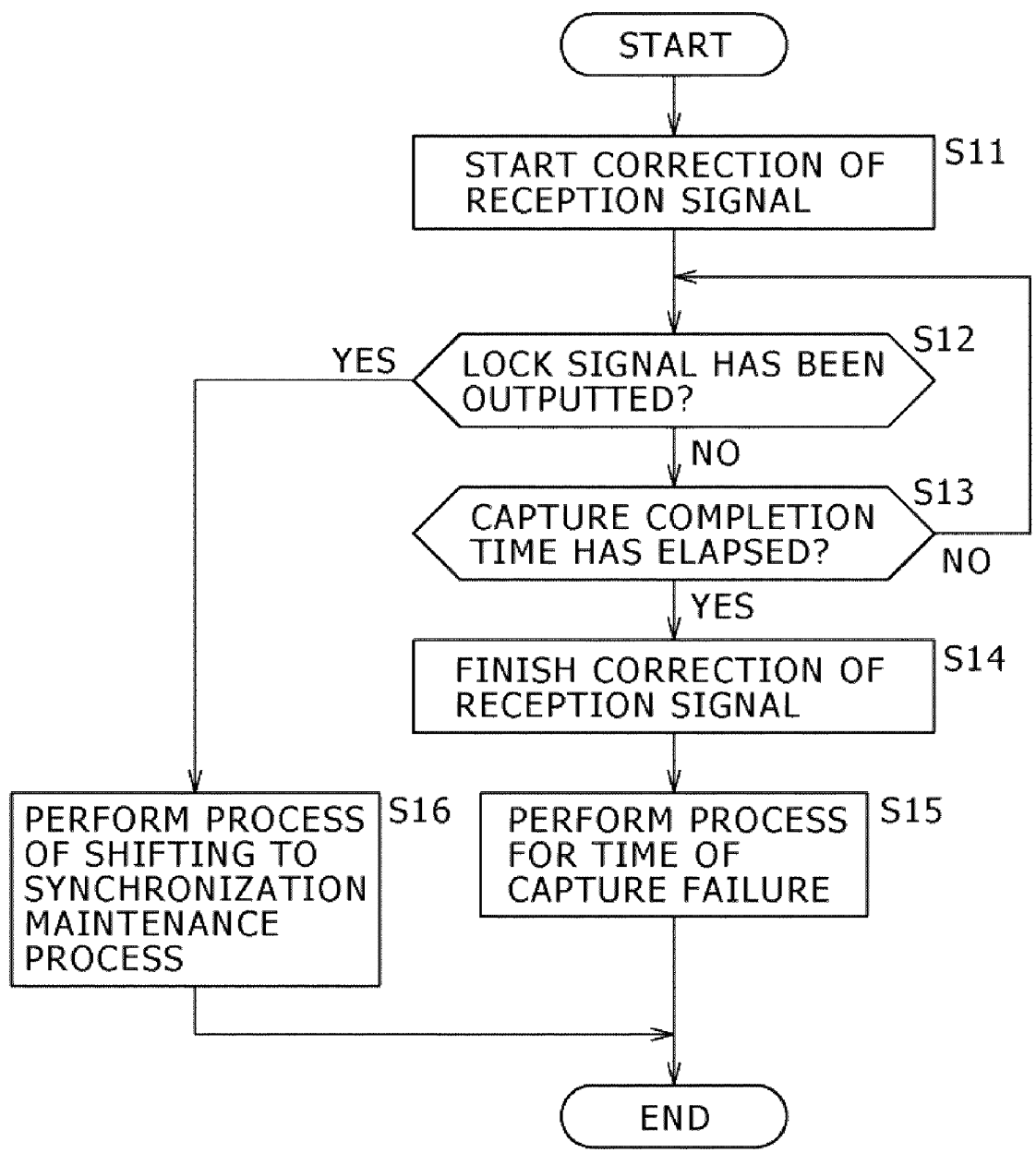
FIG. 3 is a flowchart for explaining a known initial capture process.
Figure 4:
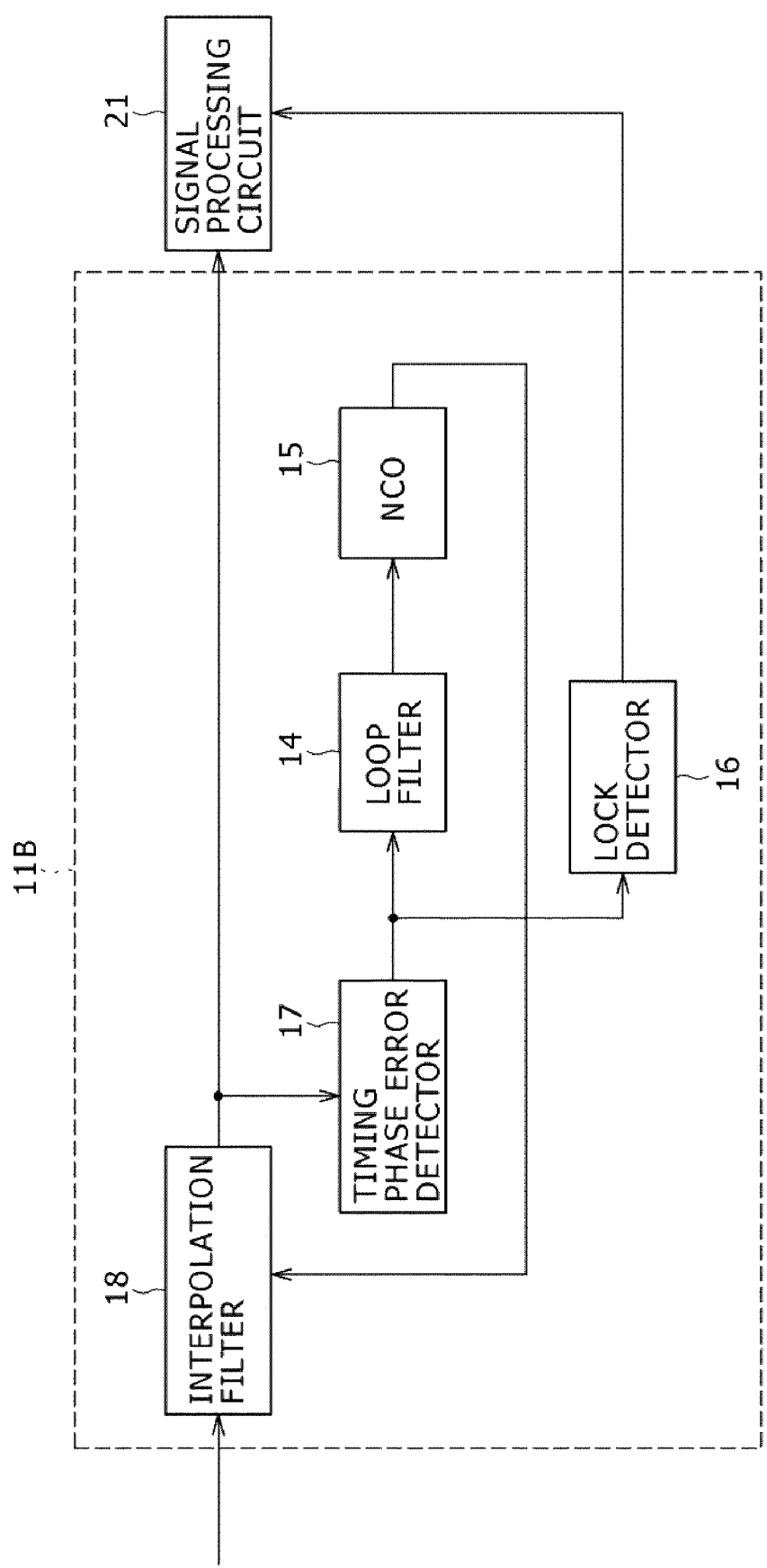
FIG. 4 is a block diagram illustrating an exemplary structure of a correction circuit 11C, which performs timing recovery.

Hereinafter, specific embodiments will be described in detail with reference to the accompanying drawings.

FIG. 5 is a block diagram illustrating an exemplary structure of a reception apparatus 31 according to an embodiment.

In FIG. 5, the reception apparatus 31 includes a timing correction circuit 32 and a signal processing circuit 33. The timing correction circuit 32 includes an interpolation filter 34, a timing phase error detector 35, a loop filter 36, an NCO 37, a lock detector 38, and a controller 39.

A signal received by a reception circuit having an antenna (not shown) is inputted to the interpolation filter 34. The interpolation filter 34 samples the reception signal inputted from the reception circuit with a frequency with specified timing. In addition, an error correction signal for correcting an error in the reception signal to be outputted from the interpolation filter 34 is supplied from the NCO 37 to the interpolation filter 34. The interpolation filter 34 adjusts the timing of the frequency with which to sample the reception signal in accordance with the error correction signal.

As a result of the interpolation filter 34 adjusting the timing of the frequency in accordance with the error correction signal as described above, deviation in timing of the reception signal to be outputted from the interpolation filter 34 is corrected. The interpolation filter 34 supplies the reception signal in which the timing deviation has been corrected to the signal processing circuit 33 and the timing phase error detector 35.

The timing phase error detector 35 detects a timing phase error in the reception signal as corrected by the interpolation filter 34 relative to a phase of timing of a predetermined reference signal, which functions as a basis for processing in the reception apparatus 31, and supplies an error signal representing the amount of the timing deviation of the reception signal to the loop filter 36 and the lock detector 38.

The loop filter 36 filters the error signal supplied from the timing phase error detector 35 in accordance with a band set by the controller 39, and supplies the filtered error signal to the NCO 37. The loop filter 36 may be formed by a PI filter with proportional and integral terms in two stages. In addition, a range (hereinafter referred to as a "capture feasible range" as appropriate) of amounts of the timing deviation of the reception signal that can be captured by the timing correction circuit 32 is determined in accordance with the band of the loop filter 36 set by the controller 39. The capture feasible range will be described in more detail later with reference to FIG. 6.

The NCO 37 controls an oscillation frequency of the error correction signal to be supplied to the interpolation filter 34 in accordance with the error signal supplied from the loop filter 36, to generate the error correction signal with an oscillation frequency corresponding to the error. For example, if the error signal supplied from the loop filter 36 has a positive value, the NCO 37 decreases the oscillation frequency of the error correction signal in accordance with that value, whereas if the error signal supplied from the loop filter 36 has a negative value, the NCO 37 increases the oscillation frequency of the error correction signal in accordance with that value.

As a result of the error correction signal as described above being supplied to the interpolation filter 34, the interpolation filter 34 adjusts the timing of the frequency with which to sample the reception signal so as to reduce the timing deviation of the corrected reception signal.

The error signal representing the amount of the timing deviation of the reception signal is supplied from the timing phase error detector 35 to the lock detector 38. The lock detector 38 monitors the error signal, and when the amount of the timing deviation of the reception signal has fallen into a predetermined error range, the lock detector 38 supplies a lock signal indicative of the capture of the reception signal to the controller 39.

When the lock signal has been supplied from the lock detector 38, the controller 39 supplies the lock signal to the signal processing circuit 33. In addition, the controller 39 performs an initial capture process in two phases, a first capture phase and a second capture phase, while varying the band of the loop filter 36 based on whether or not the lock signal is supplied from the lock detector 38.

For example, at the start of the initial capture process for capturing the reception signal, the controller 39 sets the band of the loop filter 36 to a first band, which is narrower than a band that is set in a known initial capture process, to perform the correction in the first capture phase. A timer (not shown) counts a time from the start of the initial capture process, for example, and if the lock signal has not been supplied from the lock detector 38 until an end of a predetermined capture completion time, the controller 39 sets the band of the loop filter 36 to a second band, which is wider than the band that is set in the known initial capture process, to perform the correction in the second capture phase.

As described above, the range of the amounts of the timing deviation that can be captured in the timing correction circuit 32 is determined in accordance with the band of the loop filter 36. The controller 39 sets the band of the loop filter 36 in a two-step fashion, and performs the initial capture process in the two phases, i.e., the first capture phase and the second capture phase. This makes it possible to capture the reception signal more quickly than in the known initial capture process, as long as the amount of the timing deviation is not extraordinary. Moreover, it makes it possible to capture a reception signal with so great an amount of the timing deviation that the reception signal could not be captured by the known initial capture process.

Figure 6:
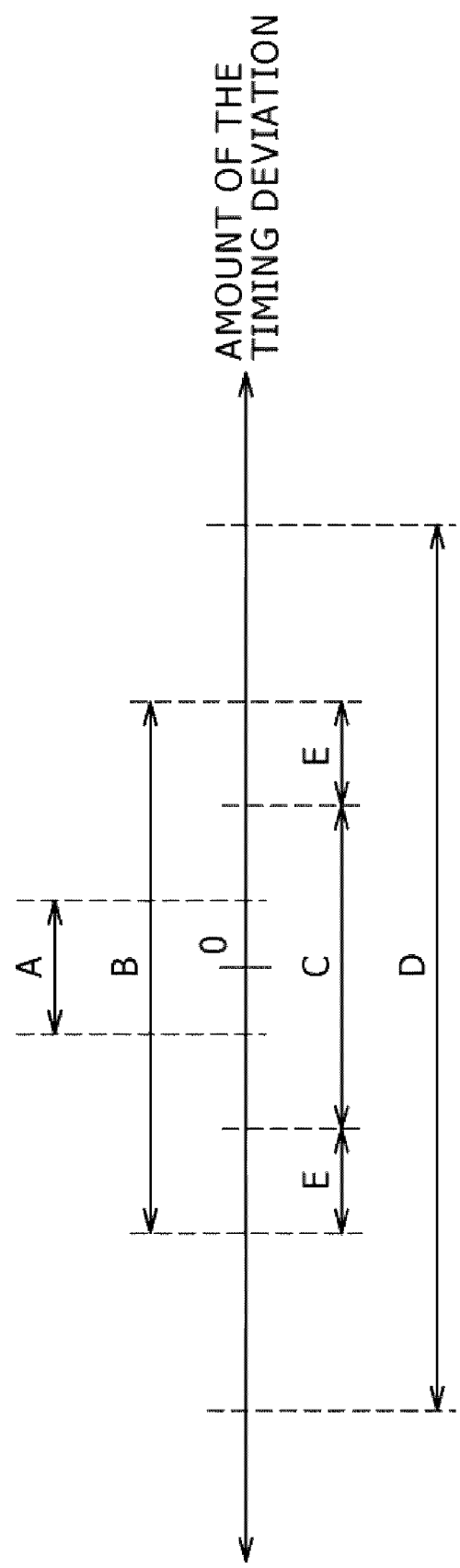
FIG. 6 is a diagram for explaining control of a band of a loop filter 36.

With reference to FIG. 6, the control of the band of the loop filter 36 will now be described below.

In FIG. 6, a horizontal axis represents the amount of the timing deviation of the reception signal. More specifically, relative to the center O of the horizontal axis, more rightward points represent larger positive amounts of the timing deviation, and more leftward points represent larger negative amounts of the timing deviation.

In addition, in FIG. 6, range A represents a range of commonly occurring amounts of the timing deviation, while range B represents the range of the amounts of the timing deviation that can be captured in accordance with the band set in the known initial capture process.

In addition, range C represents a range of amounts of the timing deviation that can be captured in accordance with the first band set in the loop filter 36 in the first capture phase of the initial capture process, while range D represents a range of amounts of the timing deviation that can be captured in accordance with the second band set in the loop filter 36 in the second capture phase of the initial capture process. Hereinafter, the range C will be referred to as "capture feasible range C" as appropriate, and the range D will be referred to as "capture feasible range D" as appropriate. Ranges E represent differential ranges between the range B and the capture feasible range C.

As described above, in the timing correction circuit 32, the initial capture process is performed in the two phases, i.e., the first capture phase and the second capture phase. In the first capture phase of the initial capture process, the first band, which corresponds to the capture feasible range C, which is narrower than the range B, is set in the loop filter 36, and if the reception signal is successfully captured as a result of the correction of the reception signal with the first band, the initial capture process is completed. On the other hand, if the reception signal is not successfully captured with the correction of the reception signal with the first band, the initial capture process transitions from the first capture phase to the second capture phase, so that the second band, which corresponds to the capture feasible range D, which is wider than the range C, is set in the loop filter 36. Then, the capture of the reception signal is performed with the correction of the reception signal with the second band.

The commonly occurring amounts of the timing deviation are approximately in the range A. In the case where the amount of the timing deviation is in this range, the reception signal can be captured in the first capture phase, and the second capture phase is skipped to shift from the initial capture process to the synchronization maintenance process. On the other hand, in the case where a greater timing deviation outside of the range A (a deviation caused experimentally) has occurred, the reception signal can be captured in the second capture phase.

Here, suppose that a timing deviation in the range E has occurred. In this case, application of the range B, i.e., the range of the amounts of the timing deviation that can be captured in accordance with the band set in the known initial capture process, would result in a long time required to capture the reception signal. Specifically, in the case where the error in the reception signal is great, compared to the capturable range, variations in the amount of the correction by the feedback loop might be so great as to make convergence of the correction amount difficult to achieve, resulting in an extended time required to achieve the convergence of the correction amount and completion of the correction.

In contrast, the capture feasible range D applied in the second capture phase has a sufficiently wide capturable range for any timing deviation approximately in the range E. Therefore, even if a timing deviation approximately in the range E has occurred, variations in the amount of the correction by the feedback loop will be so slight as to allow the capture of the reception signal to be achieved more quickly than by the known initial capture process.

Moreover, in the timing correction circuit 32, a time required for the initial capture process, i.e., the sum of a first capture completion time, which is a time required for the process in the first capture phase, and a second capture completion time, which is a time required for the process in the second capture phase, is set to be equivalent to the time required for the known initial capture process. This prevents the initial capture process as performed in the two phases from taking more time than the known initial capture process.

Suppose, for example, that a timing deviation approximately in the range E has occurred. In this case, if the initial capture process is performed in the two phases, a period of time corresponding to the first capture completion time is wasted. However, setting of the total time required for the initial capture process in the above-described manner prevents an increase in the total time for the initial capture process. This also prevents an increase in the capture time. In addition, even if an error outside of the range B applied in the known initial capture process has occurred, the reception signal can be captured in the second capture phase.

In the timing correction circuit 32, if the reception signal is captured in the first capture phase or in the second capture phase, a band corresponding to a range narrower than the range A as shown in FIG. 6 is set in the loop filter 36.

As described above, the band of the loop filter 36 is set in the two-step fashion, and the initial capture process is performed in the two phases, i.e., the first capture phase and the second capture phase. Thus, when the amount of the timing deviation is in a commonly occurring range, the reception signal can be captured in the first capture phase, and quicker than it would be captured in the known initial capture process. Moreover, even when the amount of the timing deviation of the reception signal is so great that the reception signal could not be captured by the known initial capture process, the reception signal can be captured in the second capture phase. In other words, the reception signal can be captured more efficiently than in the related art.

Figure 7:
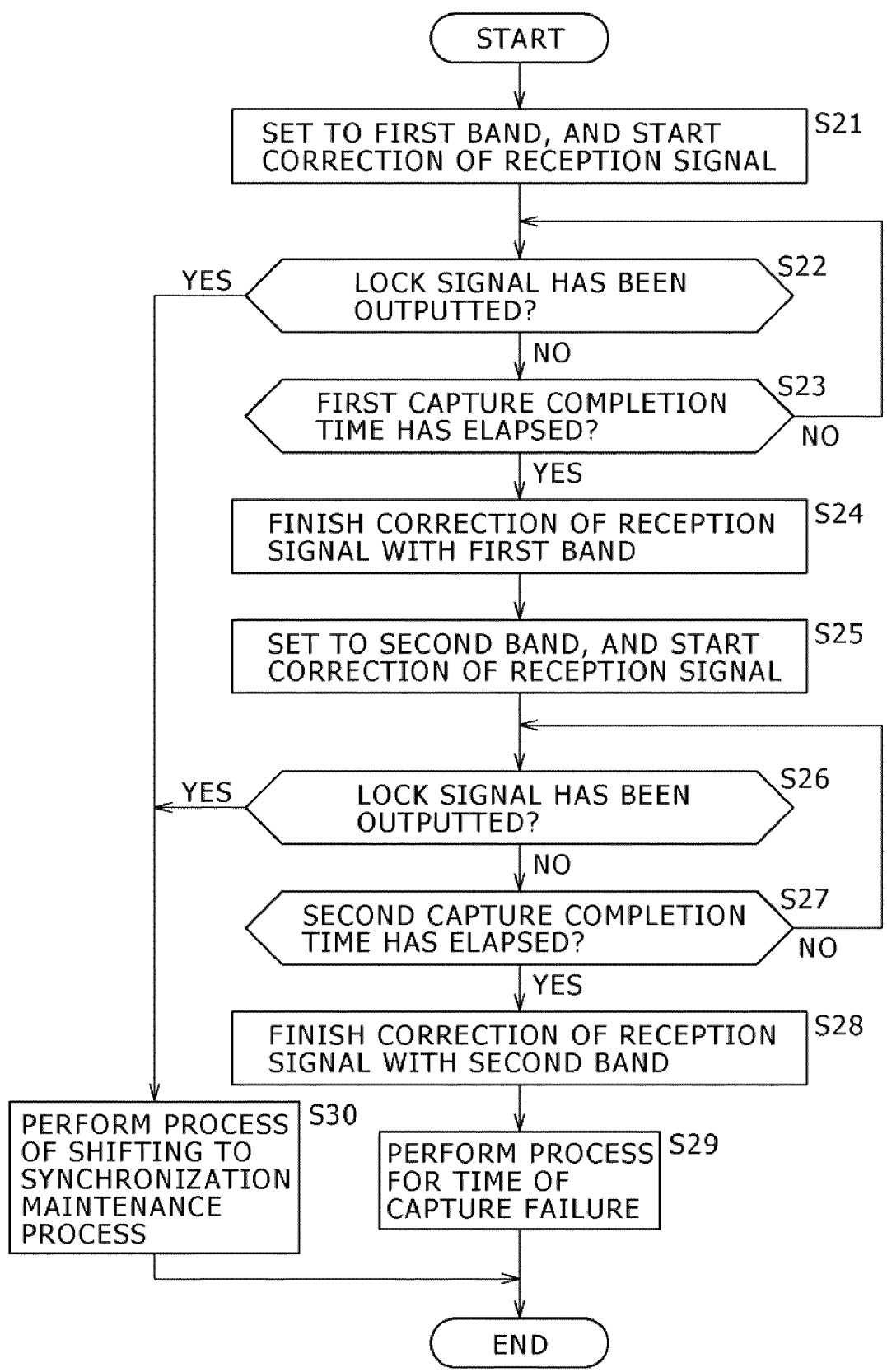
FIG. 7 is a flowchart illustrating an initial capture process in a timing correction circuit 32.

Next, FIG. 7 is a flowchart illustrating the initial capture process performed in the timing correction circuit 32 as illustrated in FIG. 5.

For example, if the reception apparatus 31 receives a signal transmitted from a transmitter (not shown) and starts a process of demodulating the reception signal, the initial capture process is started. At step S21, the controller 39 sets the band of the loop filter 36 to the first band, and starts the counting of the time by the timer (not shown). Then, the correction of the reception signal in the first capture phase is started by the feedback loop composed of the interpolation filter 34, the timing phase error detector 35, the loop filter 36, and the NCO 37, while the monitoring of the error signal is started in the lock detector 38. In other words, the correction of the reception signal with the first band, corresponding to the capture feasible range C as shown in FIG. 6, is started.

After the process of step S21, control proceeds to step S22. At step S22, the controller 39 determines whether or not the reception signal has been captured, i.e., whether or not the lock detector 38 has outputted the lock signal.

If the controller 39 determines at step S22 that the reception signal has not been captured, control proceeds to step S23. At step S23, the controller 39 determines whether or not the time of the timer started at step S21 has passed an end of the first capture completion time.

If the controller 39 determines at step S23 that the first capture completion time has not elapsed yet, control returns to step S22.

Meanwhile, if the controller 39 determines at step S23 that the first capture completion time has elapsed, control proceeds to step S24. At step S24, the correction of the reception signal in the first capture phase is finished in the timing correction circuit 32.

After the process of step S24, control proceeds to step S25. At step S25, the controller 39 sets the band of the loop filter 36 to the second band, and resets the timer (not shown) to restart the counting of the time. Then, the correction of the reception signal in the second capture phase is started by the feedback loop composed of the interpolation filter 34, the timing phase error detector 35, the loop filter 36, and the NCO 37, while the monitoring of the error signal is started in the lock detector 38. In other words, the correction of the reception signal with the second band, corresponding to the capture feasible range D as shown in FIG. 6, is started.

After the process of step S25, control proceeds to step S26. At step S26, the controller 39 determines whether or not the reception signal has been captured, i.e., whether or not the lock detector 38 has outputted the lock signal.

If the controller 39 determines at step S26 that the reception signal has not been captured yet, control proceeds to step S27. At step S27, the controller 39 determines whether or not the time of the timer started at step S25 has passed an end of the second capture completion time.

If the controller 39 determines at step S27 that the second capture completion time has not elapsed, control returns to step S26.

Meanwhile, if the controller 39 determines at step S27 that the second capture completion time has elapsed, control proceeds to step S28. At step S28, the correction of the reception signal in the second capture phase is finished in the timing correction circuit 32.

After the process of step S28, control proceeds to step S29. At step S29, the controller 39 supplies a signal indicative of the failure to capture the reception signal to the signal processing circuit 33, and the initial capture process is finished. In this case, the signal processing circuit 33 performs a process that should be performed when the capture of the reception signal has ended in failure. Examples of such a process include: a process of causing the timing correction circuit 32 to repeat the process for capturing the reception signal a predetermined number of times; and a process of displaying, on a display section (not shown), an indication that the reception of the reception signal has ended in failure.

Meanwhile, if the controller 39 determines at step S22 or step S26 that the reception signal has been captured, control proceeds to step S30. At step S30, the controller 39 performs a process of shifting from the initial capture process to the synchronization maintenance process. For example, the controller 39 sets the band of the loop filter 36 to a band narrower than the band corresponding to the capture feasible range C. After the process of step S30, the initial capture process is finished.

As described above, in the timing correction circuit 32, the band of the loop filter 36 is set in the two-step fashion, and the initial capture process is performed in the two phases. This enables the capture of reception signals with more substantial deviation, while avoiding an increase in the capture time. Since the increase in the capture time is avoided, an increase in a demodulation time, i.e., a time from the start of the reception of the reception signal till completion of the demodulation and output of the reception signal, is also avoided.

In the present embodiment, the case where the timing correction is performed in the timing correction circuit 32 has been described. Note, however, that the correction performed in the correction circuit is not limited to the timing correction. For example, the interpolation filter 34 and the timing phase error detector 35 may be replaced with a frequency correction section and a frequency error detector, respectively, to perform correction of the frequency of the reception signal. Further, the present application is also applicable to automatic gain control (AGC) for performing correction of the amplitude of the reception signal, for example. In such manners, necessary means may be applied as appropriate as error detection means and correction means, depending on the object (e.g., the timing, the frequency, or the amplitude) of the correction.

As described above, the present embodiments are applicable to processes for correcting errors to achieve a desired (ideal) condition, such as the timing correction, the frequency correction, or the amplitude correction. When the embodiments are applied to all such processes, a further reduction in the capture time will be achieved.

In the above-described embodiment, the controller 39 is provided in the timing correction circuit 32, and the controller 39 controls the band of the loop filter 36. Note, however, that a computer that controls various parts of the reception apparatus 31 may execute software to control the band of the loop filter 36, for example.

That is, the above-described series of processes may be implemented either in hardware or in software. In the case where the series of processes is implemented in software, a program that forms the software is installed from a program storage medium into a computer having dedicated hardware configuration or into a general-purpose personal computer or the like that, when various programs are installed thereon, becomes capable of performing various functions, for example.

FIG. 8 is a block diagram illustrating an exemplary hardware configuration of a computer (a microcomputer) that performs the above-described series of processes in accordance with the program.

The program may be stored (installed) beforehand in an electrically erasable programmable read-only memory (EEPROM) 105 or a ROM 103, which are storage media contained in the computer.

Alternatively, the program may be stored (recorded) temporarily or permanently in and provided from a removable storage medium such as a flexible disk, a compact disc read-only Memory (CD-ROM), a magneto-optical (MO) disk, a digital versatile disc (DVD), a magnetic disk, or a semiconductor memory.

The program may be installed from the removable storage medium as mentioned above into the computer, and besides, the program may be transferred to the computer in a wired manner via a wired or wireless network, and the computer may receive the program transferred in such a manner via an input/output interface 110 and install the received program into the EEPROM 105 contained therein.

In the computer, a central processing unit (CPU) (or a digital signal processor (DSP)) 102, the read-only memory (ROM) 103, a random access memory (RAM) 104, the EEPROM 105, and the input/output interface 110 are connected to one another via a bus 101.

The CPU 102 loads the program stored in the read-only memory (ROM) 103 or the EEPROM 105 into the random access memory (RAM) 104 to execute it. The CPU 102 thus performs a procedure in accordance with the above-described flowchart, or a procedure that is performed in accordance with the configuration as described above with reference to the above-described block diagram. Exchange of data with an external entity is performed via the input/output interface 110.

Note that the program executed by the computer may be a program that causes the processes to be performed chronologically in an order as described in the present specification, or a program that causes some of the processes to be performed in parallel or with appropriate timing, such as when calls have been issued.

Note that the processes as described above with reference to the above-described flowchart may not necessarily be performed chronologically in accordance with the order as indicated in the flowchart. Some of the processes may be performed in parallel or independently of one another (e.g., parallel processing or processing based on an object). Also note that the program may either be processed by a single CPU, or by a plurality of CPUs via distributed processing.

It should be understood that various changes and modifications to the presently preferred embodiments described herein will be apparent to those skilled in the art. Such changes and modifications can be made without departing from the spirit and scope of the present subject matter and The invention is claimed as follows:

1. A reception apparatus that receives a signal, the reception apparatus comprising:
   correction means for correcting an error in the signal in order to capture the signal;
   error detection means for detecting an error in the signal after the correction as outputted from the correction means, relative to a predetermined reference signal;
   filtering means for filtering the error detected by the error detection means with a predetermined band;
   error correction signal generation means for generating an error correction signal indicative of an amount of correction of the error based on the error filtered by the filtering means, and supplying the error correction signal to the correction means; and
   setting means for setting the predetermined band of the filtering means to a first band at a start of the correction by the correction means, and, if capture of the signal is not completed until a predetermined capture completion time elapses since the start of the correction by the correction means, setting the predetermined band of the filtering means to a second band wider than the first band.

2. The reception apparatus according to claim 1, further comprising
   error monitoring means for monitoring the error detected by the error detection means to detect completion of the capture of the signal, wherein
   if the completion of the capture of the signal is detected by the error monitoring means, the setting means sets the band of the filtering means to a third band narrower than the first band.

3. The reception apparatus according to claim 1, further comprising:
   a controller,
   wherein if capture of the signal is completed before the predetermined capture completion time elapses since the start of the correction by the correction means, the controller shifts from a capture process to a synchronization maintenance process for maintaining synchronization of the captured signal.

4. The reception apparatus according to claim 1, wherein a band of the filtering means is set in a two-step fashion.

5. A reception method employed in a reception apparatus that receives a signal,
   the reception apparatus including
   correction means for correcting an error in the signal in order to capture the signal,
   error detection means for detecting an error in the signal after the correction as outputted from the correction means, relative to a predetermined reference signal,
   filtering means for filtering the error detected by the error detection means with a predetermined band, and
   error correction signal generation means for generating an error correction signal indicative of an amount of correction of the error based on the error filtered by the filtering means, and supplying the error correction signal to the correction means,
   the reception method comprising
   setting the predetermined band of the filtering means to a first band at a start of the correction by the correction means, and, if capture of the signal is not completed until a predetermined capture completion time elapses since the start of the correction by the correction means, setting the predetermined band of the filtering means to a second band wider than the first band.

6. A non-transitory computer readable medium storing a computer program including executable instructions that when executed by a processor performs steps for controlling a reception apparatus that receives a signal,
   the reception apparatus including
   correction means for correcting an error in the signal in order to capture the signal,
   error detection means for detecting an error in the signal after the correction as outputted from the correction means, relative to a predetermined reference signal,
   filtering means for filtering the error detected by the error detection means with a predetermined band, and
   error correction signal generation means for generating an error correction signal indicative of an amount of correction of the error based on the error filtered by the filtering means, and supplying the error correction signal to the correction means,
   the steps including
   setting the predetermined band of the filtering means to a first band at a start of the correction by the correction means, and, if capture of the signal is not completed until a predetermined capture completion time elapses since the start of the correction by the correction means, setting the predetermined band of the filtering means to a second band wider than the first band.

7. A reception apparatus that receives a signal, the reception apparatus comprising:
   a correction section configured to correct an error in the signal in order to capture the signal;
   an error detection section configured to detect an error in the signal after the correction as outputted from the correction section, relative to a predetermined reference signal;
   a filtering section configured to filter the error detected by the error detection section with a predetermined band;
   an error correction signal generation section configured to generate an error correction signal indicative of an amount of correction of the error based on the error filtered by the filtering section, and supplying the error correction signal to the correction section; and
   a setting section configured to set the predetermined band of the filtering section to a first band at a start of the correction by the correction section, and, if capture of the signal is not completed until a predetermined capture completion time elapses since the start of the correction by the correction section, setting the predetermined band of the filtering section to a second band wider than the first band.

* * * * *